United States Patent
Trelin

(10) Patent No.: US 10,949,517 B2
(45) Date of Patent: Mar. 16, 2021

(54) IDENTIFICATION SYSTEM ENROLLMENT AND VALIDATION AND/OR AUTHENTICATION

(71) Applicant: Alclear, LLC, New York, NY (US)

(72) Inventor: Joe Trelin, New York, NY (US)

(73) Assignee: ALCLEAR, LLC, New York, NY (US)

( * ) Notice: Subject to any disclaimer, the term of this patent is extended or adjusted under 35 U.S.C. 154(b) by 94 days.

(21) Appl. No.: 16/285,696

(22) Filed: Feb. 26, 2019

(65) Prior Publication Data

US 2019/0266314 A1 Aug. 29, 2019

Related U.S. Application Data

(60) Provisional application No. 62/636,132, filed on Feb. 27, 2018.

(51) Int. Cl.
*G06F 21/32* (2013.01)
*G06K 9/00* (2006.01)

(52) U.S. Cl.
CPC ......... *G06F 21/32* (2013.01); *G06K 9/00892* (2013.01); *G06K 9/00899* (2013.01)

(58) Field of Classification Search
None
See application file for complete search history.

(56) References Cited

U.S. PATENT DOCUMENTS

| | | |
|---|---|---|
| 8,381,969 B1 | 2/2013 | Miller et al. |
| 8,423,462 B1 | 4/2013 | Amacker et al. |
| 8,521,131 B1 | 8/2013 | Ramalingam et al. |
| 8,744,966 B1 | 6/2014 | Amacker et al. |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,203,860 B1 * | 12/2015 | Casillas ............... H04L 63/1433 |
| 9,324,098 B1 | 4/2016 | Agrawal et al. |
| 9,386,507 B1 | 7/2016 | Ramalingam et al. |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,836,642 B1 | 12/2017 | Ramaswamy |

(Continued)

*Primary Examiner* — Justin P. Misleh
(74) *Attorney, Agent, or Firm* — Brownstein Hyatt Farber Schreck, LLP

(57) ABSTRACT

A system performs identification system enrollment and validation and/or authentication. In some examples, the system receives a digital representation of a biometric for a person from a device, biographic information for the person, and monitoring of capture of the biometric and determines whether the biometric is genuine. In others, the system obtains data from a network search using the biometric and the information, generates a comparison of the biometric and the information to the data from the network search, and uses the comparison to determine whether the person is who the person asserts. In still others, the system performs a number of identity checks using the information and the biometric, weights certainty and risk of each of the number of identity checks, and determines whether to approve the person for identification system enrollment using an aggregation of the identity checks.

20 Claims, 7 Drawing Sheets

(56) References Cited

U.S. PATENT DOCUMENTS

| | | |
|---|---|---|
| 9,876,788 B1* | 1/2018 | Ziraknejad .............. G06F 21/34 |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 2007/0110285 A1* | 5/2007 | Hanna ................ G06K 9/00899 382/117 |
| 2012/0293642 A1* | 11/2012 | Berini ................... G06F 21/602 348/77 |
| 2017/0147875 A1* | 5/2017 | Hagelin ............. G06Q 20/4014 |
| 2017/0249660 A1* | 8/2017 | Smith .................... G06Q 50/01 |
| 2018/0007060 A1 | 1/2018 | Leblang et al. |
| 2018/0082304 A1* | 3/2018 | Summerlin ........ G06Q 20/4016 |
| 2018/0124047 A1* | 5/2018 | Fisher .................... G06F 21/31 |
| 2018/0181794 A1* | 6/2018 | Benini ............... G06K 9/00228 |
| 2019/0036939 A1 | 1/2019 | Johansson et al. |

* cited by examiner

IDENTIFICATION SYSTEM ENROLLMENT AND VALIDATION AND/OR AUTHENTICATION

CROSS-REFERENCE TO RELATED APPLICATION(S)

This application is a non-provisional patent application of and claims the benefit to U.S. Provisional Patent Application No. 62/636,132, filed Feb. 27, 2018, and titled "Identification System Enrollment and Validation," the disclosure of which is hereby incorporated herein by reference in its entirety.

FIELD

The described embodiments relate generally to identification systems. More particularly, the present embodiments relate to enrollment in identification systems and validation or authentication of identity in identification systems.

BACKGROUND

Identification systems may use a variety of different mechanisms to identify a person, track that person, determine actions the person is authorized and/or trustworthy to perform, protect access to information stored in association with an identity, and so on. For example, a security checkpoint at an airport, sporting event, workplace, car rental agency, or other restricted access venue may use an identification system to determine that a person is authorized to enter, the kind of security screening to perform on that person, actions to allow that person to perform, and so on.

Identification systems may use one or more biometrics (such as one or more hashes or other digital representations of one or more fingerprints, facial images, iris images, retina images, voiceprints, gaits, heart rhythms or other biological information, and so on) to identify a person. In order to allow a person to be identified using a biometric, that person may first be enrolled with the identification system. Enrollment may involve the person providing a digital representation of his or her biometric as well as biographic information. This may allow the biographic information to be later retrieved to identify the person when the person later again provides a digital representation of his or her biometric.

SUMMARY

The present disclosure relates to identification system enrollment and validation and/or authentication. In various implementations, a person may be electronically monitored while providing a digital representation of a biometric and biographic information to ensure that authentic biometric data for that person is provided. In some implementations, a provided digital representation of a biometric and biographic data may be compared against data returned from internet searches to assess the likelihood that the person is who the person claims to be. In various implementations, a number of identity checks may be performed for a person who provides a digital representation of a biometric and biographic data where a certainty and risk score is determined for each identity check and aggregated to determine if obtained information is sufficient to positively identify that the person is who the person claims to be. In numerous implementations, various combinations of these features may be performed.

In various embodiments, a system for identification system enrollment and validation includes at least one non-transitory storage medium that stores instructions, a communication component, and at least one processor communicably coupled to the communication component. The at least one processor executes the instructions to receive a digital representation of a biometric for a person from a device via the communication component, receive biographic information for the person via the communication component, receive monitoring of capture of the digital representation of the biometric via the communication component, and determine whether the digital representation of the biometric is genuine using the monitoring.

In some examples, the at least one processor enrolls the person in the identification system when the processor determines the digital representation of the biometric to be genuine. In a number of examples, the digital representation of the biometric is an image of at least a portion of the person. In various examples, the monitoring includes at least one image of the person capturing the image.

In some examples, the device is a first device and includes iris dilation responses to a sequence of colored lights presented during the capture of the digital representation of the biometric. In some implementations of such examples, the monitoring is received from the device.

In some embodiments, a system for identification system enrollment and validation includes at least one non-transitory storage medium that stores instructions, a communication component, and at least one processor communicably coupled to the communication component. The at least one processor executes the instructions to receive a digital representation of a biometric for a person and biographic information for the person via the communication component; obtain data from a network search using the digital representation of the biometric and the biographic information; generate a comparison of the digital representation of the biometric and the biographic information to the data from the network search; and using the comparison, determine whether the person is who the person asserts.

In various examples, the comparing is based at least on a volume of the data returned, a number of sources that return the data, reliability of the sources that return the data, a number of social media connections indicated by the sources, accuracy review of the data, positive identification of the social media connections, or assessment whether the person knows one of the social media connections. In a number of examples, the data includes information from a social media network.

In some examples, the digital representation of the biometric is an image of at least a portion of the person. In various implementations of such examples, the network search is an image search that uses the image.

In a number of embodiments, a system for identification system enrollment and validation includes at least one non-transitory storage medium that stores instructions, a communication component, and at least one processor communicably coupled to the communication component. The at least one processor executes the instructions to receive biographic information for a person and a digital representation of a biometric for the person via the communication component, perform a number of identity checks using the biographic information and the digital representation of the biometric, weight certainty and risk of each of the number of identity checks, and determine whether to approve the person for identification system enrollment using an aggregation of the identity checks.

In various examples, the at least one processor ceases to perform the number of identity checks when the aggregation of the identity checks allows for authentication of an identity of the person. In some implementations of such examples, the at least one processor authenticates the identity of the person.

In some examples, at least one of the number of identity checks is a validation of the biographic information. In a number of examples, the at least one processor receives a scan of a piece of identification and results of a white light verification of the piece of identification.

In various examples, the at least one processor verifies that the person is in possession of a mobile electronic device. In some implementations of such examples, the at least one processor receives the biographic information for the person and the digital representation of the biometric for the person from the mobile electronic device via the communication component. In a number of examples, at least one of the number of identity checks is a comparison between the biographic information and the digital representation of the biometric.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
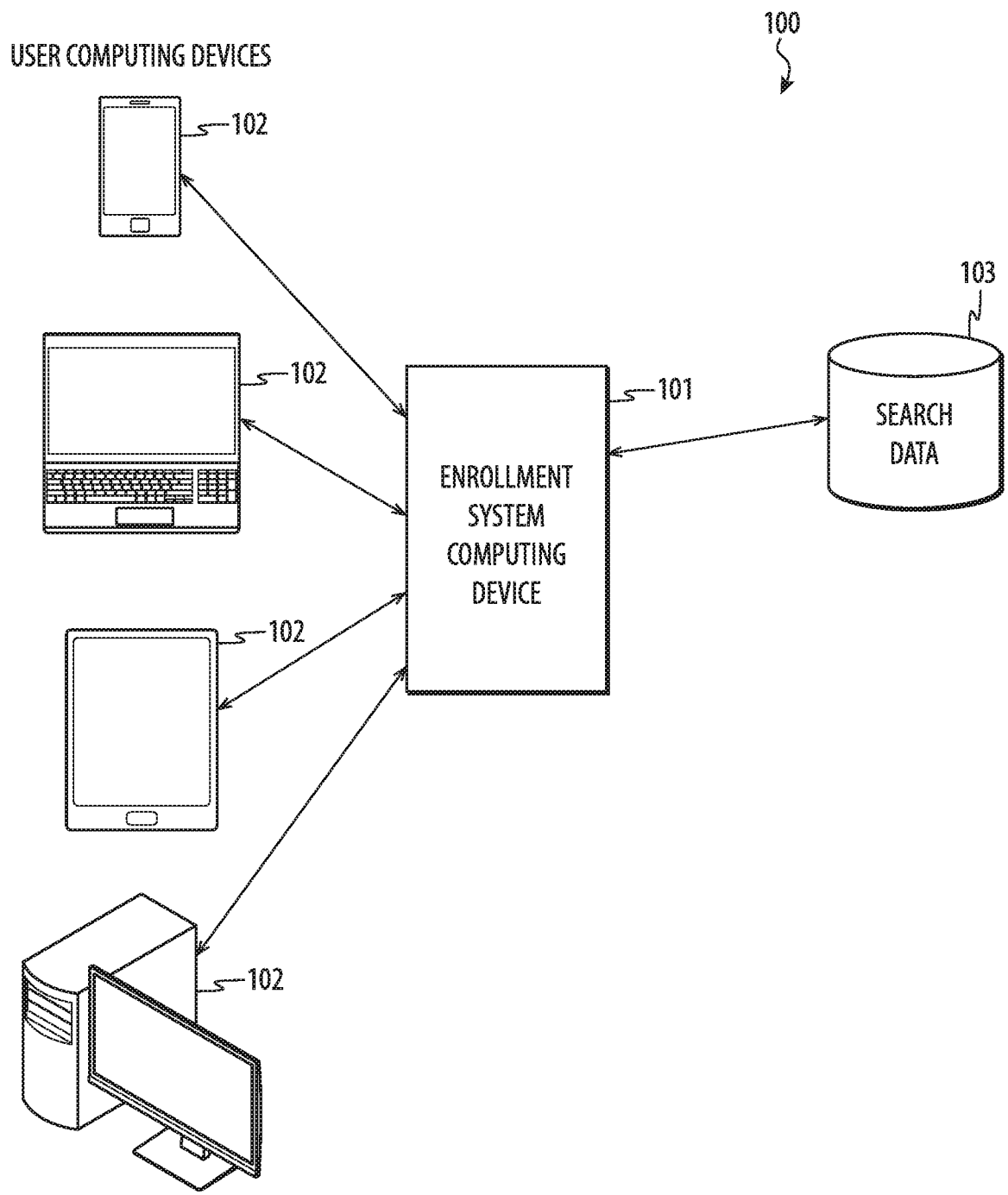
FIG. 1 depicts a first example system for identification system enrollment and/or validation and/or authentication of identity in identification systems.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Identification systems may be dependent on the validity of the enrollment information and/or the authenticity of the identity associated with the enrollment information. If invalid biographic information is provided at enrollment or if biographic information is provided that is not associated with the person who provides the digital representation of the biometric and/or the identity associated with the biographic information is not authentic, misidentification may occur. Identification performed by such an identification system may not be highly accurate.

For example, a person could provide biographic information for another person (such as by providing a forged driver's license) while allowing a picture of himself or herself to be captured. By way of another example, a person could provide information from his or her own driver's license while holding up an image of another person to be captured. Identification of the person using the captured picture in either case may be inaccurate.

In some implementations, a person may enroll in an identification system at a facility controlled by an entity that operates the identification system or one of its agents. In such an implementation, the entity or its agents may be able to inspect presented identification, perform background checks, monitor how biometrics are captured, and so on in order to validate and/or authenticate the identity of the person who is enrolled. However, this may be burdensome on both the person enrolled and the entity or its agents. Such a burden may be partially or fully mitigated if a person could enroll mobile from the entity or its agents (such as using the person's own cell phone, tablet, laptop, and/or other mobile or non-mobile electronic device) while still allowing the entity or its agents to validate and/or authenticate the identity of the enrolled person.

The following disclosure relates to identification system enrollment and validation and/or authentication. In various implementations, a person may be electronically monitored while providing a digital representation of a biometric and biographic information to ensure that authentic biometric data for that person is provided. In some implementations, a provided digital representation of a biometric and biographic data may be compared against data returned from internet searches to assess the likelihood that the person is who the person claims to be. In various implementations, a number of identity checks may be performed for a person who provides a digital representation of a biometric and biographic data where a certainty and risk score is determined for each identity check and aggregated to determine if obtained information is sufficient to positively identify that the person is who the person claims to be. In numerous implementations, various combinations of these features may be performed.

In this way, identification systems and/or the electronic devices used in such identification systems may be capable of performing enrollment, identity validation and/or authentication, and other functions that they were not previously capable of performing. The identification systems may be thus able to operate more efficiently and consume fewer resources, resulting in improved operation of the identification systems and/or the electronic devices used in such identification systems.

These and other embodiments are discussed below with reference to FIGS. 1-7. However, those skilled in the art will readily appreciate that the detailed description given herein with respect to these Figures is for explanatory purposes only and should not be construed as limiting.

In some implementations, an entity operating an identification system may enroll people in the identification system at facilities located at airports or other public and/or private locations. The enrollment process at such controlled facilities may capture and/or validate and/or authenticate one or more biometrics, biographic data, and/or identities. This process may ensure with great accuracy that collected digital representations of biometrics are matched with the proper identity of the person who is registering and that the identity is authentic.

The present disclosure extends that kind of positive identification to other environments. For example, people may enroll at home, using mobile devices, and so on. At the same time, the identification system may be able to positively authenticate the enrollee with the same level of confidence as identification system controlled facilities by replacing the onsite technologies with one or more of the technologies discussed herein.

FIG. 1 depicts a first example system 100 for identification system enrollment and/or validation and/or authentication of identity in identification systems. The system 100 may include one or more enrollment system computing devices 101, one or more user computing devices 102, and one or more sources of search data 103. The user computing device 102 may execute an application programming interface (API) or other software associated with the identification system in order to communicate with the enrollment system computing device 101. The user computing device 102 may provide one or more digital representations of one or more biometrics for a person as well as biographic information in a manner that may be controlled by the identification system. The enrollment system computing device 101 may receive the digital representation of the biometric and the biographic information, may validate such, determine whether or not an identity of the person can be authenticated, obtain related information from one or more of the sources of search data, deny the person, enroll the person, require more information, and so on.

For example, the digital representation of the biometric may include any electronic representation (such as a hash, an encrypted data structure, and so on) of biometric data. Biometric data may include, but is not limited to, one or more hashes or other digital representations of one or more fingerprints, facial images, iris images, retina images, voiceprints, gaits, heart rhythms or other biological information, and so on. Biographic information may include one or more names, addresses, telephone numbers, email addresses, personal identifiers (such as social security numbers, driver's license numbers, and so on), social media account identifiers, and so on.

By way of example, an image of a person's face may be captured as well as an image of the person's driver's license (or other identification card, such as a state identification card, a military identification card, a passport, and so on). The enrollment system computing device may receive these images or various processed versions thereof, extract various information from such, use the images and/or the information to obtain data from the one or more of the sources of search data (such as image searches, social media data, telephone directory searches, and so on), and evaluate the images, the information, and/or the data to determine if an identity of the person can be authenticated and enrolled in the identification system.

Figure 2:
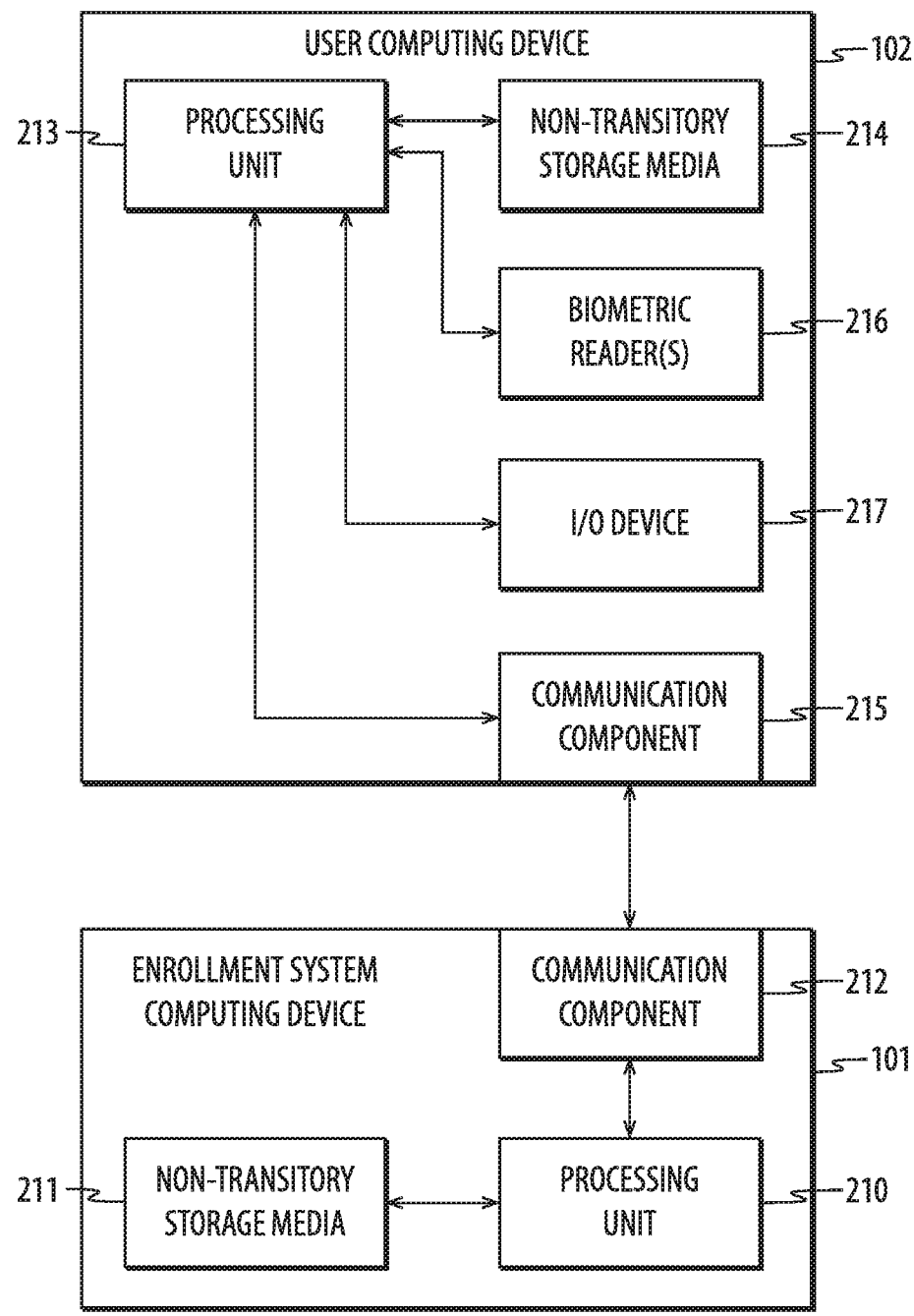
FIG. 2 depicts relationships between example components of example user computing devices and example enrollment system computing devices that may be used in the system of FIG. 1.

FIG. 2 depicts relationships between example components of example user computing devices 102 and example enrollment system computing devices 101 that may be used in the system 100 of FIG. 1. The user computing device 102 may include various components such as one or more processing units 213 (or processors, controllers, and so on), non-transitory storage media 214 (which may take the form of, but is not limited to, a magnetic storage medium; optical storage medium; magneto-optical storage medium; read only memory; random access memory; erasable programmable memory; flash memory; and so on), biometric readers 216 (such as one or more still image and/or video cameras, fingerprint readers, fingerprint scanners, cameras and/or other 2D or 3D image capture devices, microphones, heart rhythm monitors or other biological sensors, and so on), input/output devices 217 (such as one or more keyboards, computer mice, touch pads, touch screens, trackpads, displays, speakers, microphones, printers, and so on), communication components 215, and so on. The processing unit 213 may execute one or more APIs and/or other software instructions stored in the non-transitory storage medium 214 to communicate with the enrollment system computing device 101 and/or perform other functions discussed herein.

Similarly, the enrollment system computing device 101 may include various components such as one or more processing units 210, non-transitory storage media 211, communication components 212, and so on. The processing unit 210 may execute various software instructions stored in the non-transitory storage medium 211 to communicate with the user computing device 102, search one or more sources of search data, and/or perform other functions discussed herein.

Various technologies/processes that may be operable to ensure accuracy of a home, mobile, and/or other non-identification system facility identification enrollment process will now be discussed. These various technologies may be used by themselves and/or in various combinations.

In various implementations, capture of biometric information and/or biographic data may be monitored. This monitoring may be evaluated to verify that the biometric information and/or biographic data are genuinely provided.

Figure 3:
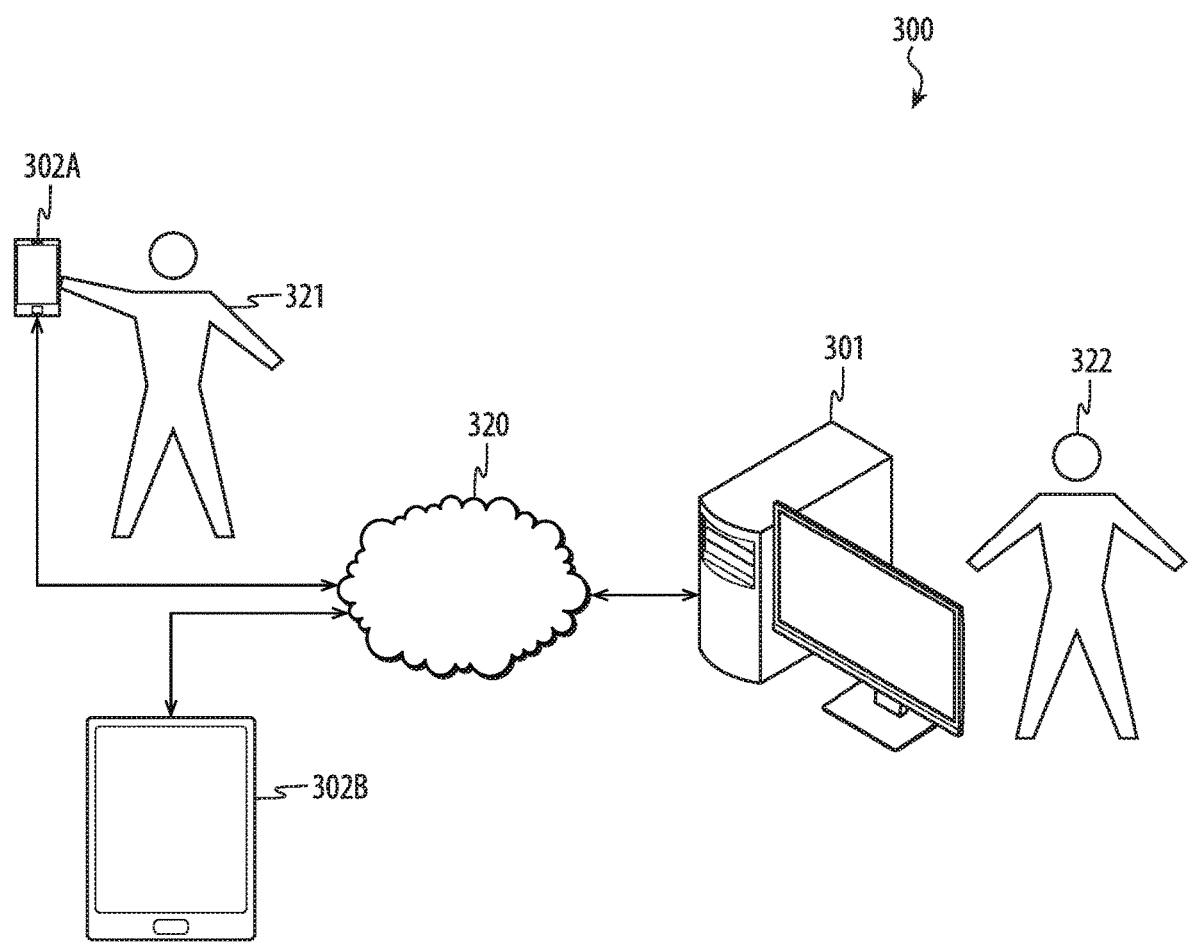
FIG. 3 depicts a second example system for identification system enrollment and/or validation and/or authentication of identity in identification systems.

FIG. 3 depicts a second example system 300 for identification system enrollment and/or validation and/or authentication of identity in identification systems. The second example system 300 may include a first user computing device 302A through which a user 321 may be able to provide a digital representation of a biometric (such as an image of the user's face) and biographic information (such as an image of the user's driver's license, various information entered into text fields of a browser, and so on), a second user computing device 302B that may be operable to monitor the user 321 providing the digital representation of the biometric and the biographic information, an enrollment system computing device 301 that may be operated by a live agent 322 to receive the digital representation of the biometric and the biographic information as well as the monitoring via one or more networks 320, and so on.

In various examples, this second example system 300 may be implemented as a group of interrelated software modules or components that perform various functions discussed herein. These software modules or components may be executed within a cloud network and/or by one or more computing devices, such as the enrollment system computing device 301, the first user computing device 302A and/or the second user computing device 302B.

This second example system 300 may provide a technology where the live agent 322 may view the enrollment process remotely through a camera and video technologies. This second example system 300 may use a paradigm of multiple camera placements where the live agent 322 may be able to see the entire process as if the user 321 was at an airport or other identification system controlled facility. This may ensure that the user 321 is conducting the identification registration him or herself and not using phony biometrics or images from biometrics.

In some implementations, the live agent 322 may be able to also offer assistance to the user 321. For example, the live agent 322 may transmit voice, text, or other data instructing the user 321 regarding how to position the second user computing device 302B so that the second user computing device 302B is able to monitor the user 321 providing the digital representation of the biometric and the biographic information via the first user computing device 302A.

In this way, the live agent 322 may be able to verify that the digital representation of the biometric and the biographic information is genuinely provided. This may allow the configuration of the computing devices in this second example system 300 to perform the verification functions that a human controlled facility operated by the entity that operates the identification system would be able to perform.

For example, the live agent 322 may be able to view the monitoring to ascertain that the user 321 is not providing biometric information from a still image or another person. By way of another example, the live agent 322 may be able to view the monitoring to ascertain that the user 321 is providing the biographic information and is not obtaining the information from another person and/or by searching various available sources of information.

It is understood that this is an example. Various other configurations are possible and contemplated without departing from the scope of the present disclosure. For example, in some implementations the monitoring may be provided by a device not controlled by the user 321. By way of another example, various image and/or video processing technologies may be used to automatically compare data from the first user computing device 302A and/or the second user computing device 302B (such as by comparing time stamps of captured data, camera angles, and so on) to verify that the digital representation of the biometric and the biographic information are genuinely provided without using the live agent 322.

In other examples, the second user computing device 302B and the live agent 322 may be omitted. For example, the first user computing device 302A may capture one or more facial images of the user 321. During the image capture, the first user computing device 302A may illuminate one or more colored lights that cause predictable iris dilations in one or more eyes of the user 321. Such illumination may be presented in a random pattern such that the user 321 is not readily able to replicate the sequence. The iris dilations in the captured images may be compared to predicted iris dilations corresponding to the illuminations to verify that the images were captured from a live human face. If the iris dilations in the captured images do not correspond to the predicted iris dilations, it may be assumed that the images are of a photographed face and/or other fraudulent mechanism. In this way, the digital representation of the biometric may be reliably validated using solely the first user computing device 302A and/or the enrollment system computing device 301 or another device without using multiple cooperating devices.

In still other examples, the biographic information may include answers to knowledge-based authentication (KBA) questions. In such examples, time limits may be imposed between the questions and the answers. In one example, answers to questions may have a time limit of thirty seconds each. These time limits may allow the live agent 322 or a computing device to verify that the answers were genuinely provided as there would not be sufficient time for the person to ask someone else or search for the requested information.

This second example system 300 is illustrated and described as using user computing devices in order to be able to enroll people in the identification system in a mobile computing configuration with respect to the enrollment system computing device. However, it is understood that this is an example. In some implementations, these functions may be performed by an automated kiosk or similar computing device arrangement that people could use to enroll in the identification system without requiring the people to use their own computing devices.

Further, this second example system 300 is illustrated and described as using the first user computing device 302A to receive the digital representation of the biometric and the biographic information while the second user computing device 302B monitors. For example, the first user computing device 302A may be used to capture an image of the person's face and obtain biographic information (such as a name, phone number, address, credit card number, and email) while the second user computing device 302B captures video of the process. However, it is understood that this is an example. In some implementations, the first user computing device 302A may be used to both obtain the digital representation of the biometric and the biographic information while monitoring the process.

For example, the person may be directed to move the first user computing device 302A to take multiple images of him or herself at various angles. The direction of angles at which to capture the multiple images may be provided by the live agent 322, an artificial intelligence or other automated process, and so on. The multiple images may be compared to each other and/or to the requested angles in order to verify that the images were genuinely captured.

This second example system 300 may provide a solution to the technological issue of authenticating identity and obtaining genuine biometric and biographic data in a system involving devices that may not be under the complete control of an entity operating an identification system. This allows for enrollment using multiple computing devices that may be located in various places and may be partially or fully controlled by the person being enrolled in the identification system, who may not be trustworthy or be the person he or she asserts to be. As a result, accurate authentication may be made possible while allowing a more flexible system of networked devices. Thus, the present disclosure relates to a technological solution to a computer network centric issue.

Further, by monitoring capture of the digital representation of the biometric and the biographic information, the second example system 300 may be able to verify that genuine biometric is obtained without requiring computationally intensive liveness determinations. For example, facial recognition biometrics that do not use monitoring for verification may instead use various image and/or video processing techniques that evaluate eye movement or other features or characteristics in the images used for facial recognition during capture. Evaluation of eye movement or other features or characteristics in the images used for facial recognition may use a great deal of processing time and computational resources in order to handle the overabundance of data created by this kind of liveness processing. The present approach of monitoring to verify capture deals with the problem of this overabundance of data by performing the verification function without evaluating eye movement or other features or characteristics in the images used for facial recognition, improving computing device function by reducing the processing time and resources used to verify capture of the digital representation of the biometric.

Figure 4:
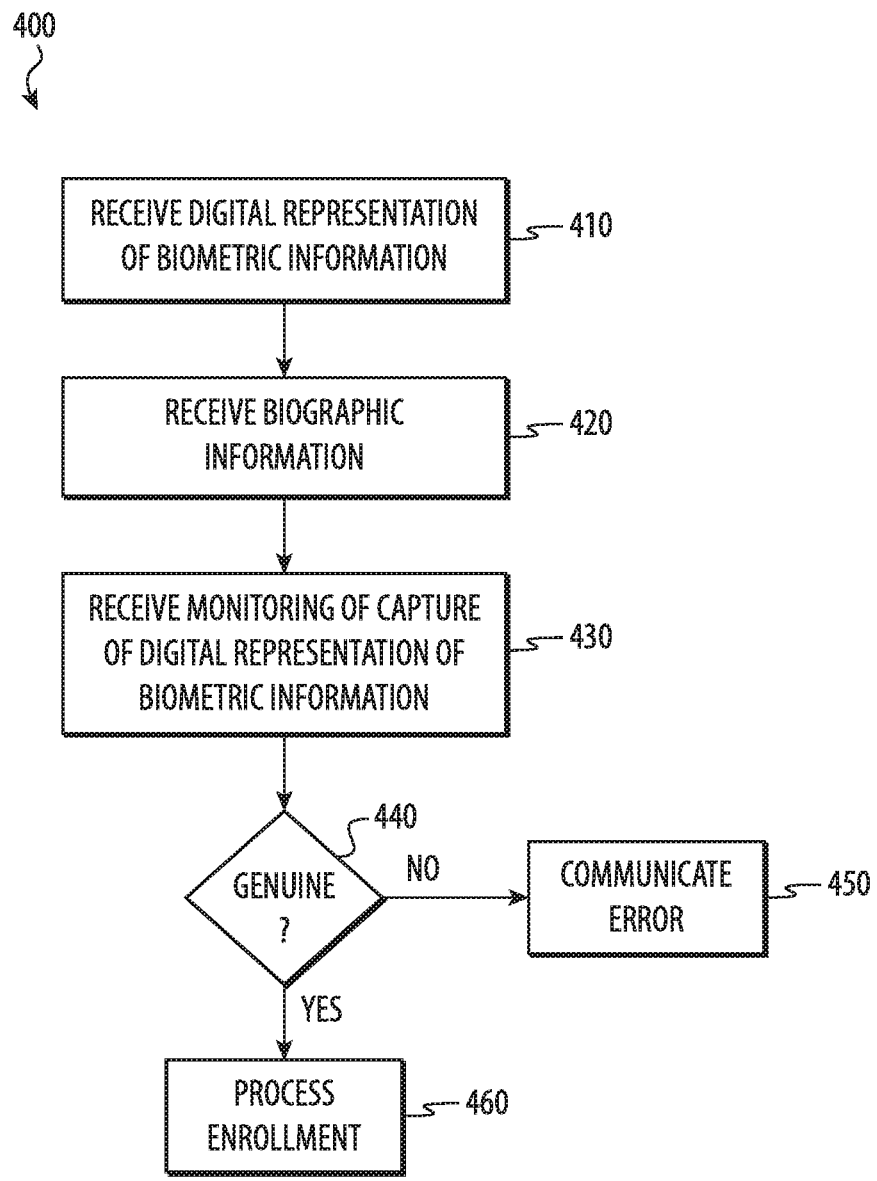
FIG. 4 depicts a flow chart illustrating a first example method for identification system enrollment and/or validation and/or authentication of identity in identification systems.

FIG. 4 depicts a flow chart illustrating a first example method 400 for identification system enrollment and/or validation and/or authentication of identity in identification systems. At 410, one or more computing devices may receive a digital representation of biometric information for a person from a device. At 420, the computing device may receive biographic information for the person. At 430, the computing device may receive monitoring of the capture of the provided digital representation of the biometric information for the person. The flow may then proceed to 440 where computing device evaluates the monitoring, the digital representation of the biometric, and/or the biographic data to determine whether or not the digital representation of the biometric is genuinely provided.

If not, the flow proceeds to 450 where the computing device communicates an error before returning to 410 where a digital representation of biometric information is received. Otherwise, if the digital representation of the biometric is genuinely provided, the flow proceeds to 460 where the computing device processes enrollment. Subsequently, the associated identification system may be operable to identify the person using a digital representation of a biometric related to the one provided during enrollment.

For example, a person may use an API or other identification system software on their phone to take a picture of him or herself. The person may also fill out a form specifying his or her name, address, telephone number, and email. Video may be captured of the person completing this process. A computing device may receive the video, picture, and information. The computing device may compare time stamps, the image to the video, and/or other information to ensure that the person genuinely took the picture of himself or herself. If so, the computing device may process enrollment.

In various examples, this first example method 400 may be implemented as a group of interrelated software modules or components that perform various functions discussed herein. These software modules or components may be executed within a cloud network and/or by one or more computing devices, such as the enrollment system computing devices 101, 301 of FIGS. 1-3.

Although the first example method 400 is illustrated and described as including particular operations performed in a particular order, it is understood that this is an example. In various implementations, various orders of the same, similar, and/or different operations may be performed without departing from the scope of the present disclosure.

For example, 420 is illustrated and described as receiving biographic information. However, it is understood that this is an example. In some implementations, an image may be received of a piece of identification (such as a driver's license, passport, state identification card, military identification card, and so on) that includes biographic information. In such an implementation, the image may be processed to extract the biographic information. Various configurations are possible and contemplated without departing from the scope of the present disclosure.

In some implementations, an identification or identity process may compare a digital representation of a biometric (such as a photograph of a person) and biographic information against data returned from internet or other network searches (such as free internet, social media, the dark web, and/or various other information gateways). For example, the process may take a picture a potential enrollee submits and an image of the potential enrollee's driver's license and compare these to the results of a number of search engines as well as social media sites. Based upon the amount and/or quality of the data returned, the process may assess the likelihood that the person is who they say they are.

In various examples, the assessment may be based upon factors such as, the volume of the data returned, the number of different sources that return the data, the reliability of the sources returning the data, the number of friends and relatives or other connections the sources indicate, subsequent review of the accuracy of the returned data, positive identification of friends and relatives or other connections, assessment whether the friends and relatives or other connections actually know this person, and so on.

For example, assessment may suggest that the likelihood is higher if the provided data matches data on multiple social media networks and/or image searches as this might indicate that the person did not simply create one fake social media account for the purposes of fraudulent identification system enrollment. Similarly, a large number of friends, relatives, and/or other connections that the person actually interacts with may also indicate that the person did not simply create one fake social media account for the purposes of fraudulent identification system enrollment. Conversely, an account on a social media network that does not verify users on which the user has a large number of connections with whom the person never interacts may indicate that the account is fake for purposes of fraudulent identification system enrollment.

The above process may use machine learning to improve. For example, the above process may improve by establishing new sources of information, improving the accuracy of the information, and so on. For example, machine learning may be used to determine if the amount of data returned was within standard deviation, which relatives or friends or other connections are more significant for verifying identity, which sources of data are more significant for verifying identity, the relationship between various data fields, assessment of risk factors that may only be observable through machine learning, the minimum and maximum number of friends and relationships or other connections an account may validly have, the projected number of friends and relationships or other connections an account may validly have, the number of degrees of separation between friends and relationships or other connections to check, and so on.

In various examples, the process may determine whether or not to ask the person to supply additional social media sites or credentials. For example, the process may be unable to obtain sufficient information regarding the person from social media sites that the process is able to access. As such, the process may determine to prompt the person to provide additional sites, credentials such as logins and/or passwords for sites requiring such to obtain information, and so on.

The process may use data analysis, data scraping, APIs, artificial intelligence, relationship algorithms, various forms of statistical analysis, and so on to determine a risk score based upon the results. For example, the process may perform statistical analysis including, but not limited to, regression analysis and Bayesian analysis to determine the risk score. The risk score may be a score representing the risk from the respective information that the person is who he or she asserts to be (in other words, that the identity is authentic). That risk score may be fed into a broader evaluation that may return an overall identity score.

In some implementations, this process may be an automated process performed by an artificial intelligence or other information collection and evaluation system. In other examples, a human being may instruct and/or use one or more computing devices to perform at least part of this searching and/or evaluation, such as the live agent discussed above and illustrated with respect to FIG. 3. Various configurations are possible and contemplated without departing from the scope of the present disclosure.

For example, one or more computing devices may receive an image of a person and a name for that person. The computing device may perform a web search, such as an image search, using the image and evaluate the results using the name or other biographic information. The results may be weighted and evaluated to determine a likelihood that the person in the image matches the name. In other words, that the person is who he or she asserts to be.

By way of example, a high number of results (such as more than ten) may be returned that indicate the image matches the name from sources that are not easily modified by the person. Examples of such sources may include a professional news site article about a university graduation including a photo with someone who matches the image and a description including the name. This may be reinforced by related photos, such as a photo in an article from another news site that depicts someone who matches the image with the president of that same university. These kind of results may be assigned higher significance due to the difficulty in forging such information (particularly when connections exist between the results, such as separate sources having the same person in a university graduation photo and in a photo shaking hands with the president of that university) and may result in a determination that there is a high likelihood (such as over 90%) that the person is who he or she asserts to be.

However, if there is not a high number of such results (such as less than two, or zero), or if there are few or no results at all, or if there are results from sources that could be modified by the person like a profile on a social media site, then less significance may be assigned to the results. As such, this may result in a determination that the likelihood that the person is who he or she asserts to be is less (such as 50% or less).

In this example, this information may then be used to search data from one or more social media sites. Bayesian analysis or similar methods may be used in some implementations. For example, social media data may be evaluated to determine whether or not there is an account with a name and/or images that match that provided by the person. The social media data may be evaluated to determine whether or not the account actually knows the people with accounts to which the account is connected. Further, multiple degrees of accounts may also be evaluated. In other words, it may be determined that the accounts to which the account is connected actually know a significant number of the accounts to which they are connected, and that those accounts also know a significant number of the accounts to which they are connected. Increasing weight may be assigned using the degree of separation as the further separated the more difficult it may be for the person to forge the data.

Thus, a social media account may be identified as related to the person. Connections to that account may be determined and evaluated. Then, connections to those accounts may be determined and evaluated. In some implementations, two to three degrees of separation from the account related to the person may be determined and evaluated. However, in various implementations, any number of degrees of separation may be determined and evaluated. In some implementations, increasing degrees of separation may be determined and evaluated until a threshold is reached regarding the likelihood that the person is who he or she asserts to be (such as 80%) or until it is determined that further degrees of separation are not possible or would not increase the likelihood of certainty.

For example, a determination may be made that a social media account with the person's name and image is connected to an account belonging to that person's mother. The mother's account may be determined to be connected to an account belonging to her neighbor. The neighbor's account may include a post of a photo with the person, the person's mother, and the neighbor. As such, more weight may be assigned to the mother's account's connection to the neighbor than to the person's account's connection to the mother, and even more weight may be assigned to the photo of the person, the person's mother, and the neighbor on the neighbor's account.

Such results may be used to supplement the determined likelihood from the web or other image search that the person is who he or she asserts to be. For example, if the results from the web or image search indicated a 50% likelihood that the person is who he or she asserts and the social media data includes the situation described above with the mother's account and the neighbor's connected account with the described photo post, the process may determine that the likelihood is increased to 98%.

In some examples, the mechanisms used to determine and evaluate connections may be modified over time by machine learning and/or artificial intelligence. For example, one account may be identified as actually knowing another account using the people associated with the two accounts being college classmates. Once the accounts are identified as actually knowing each other using their status as classmates, the way that the accounts interact with each other's posts may be analyzed. Trends identified from how two accounts verified as actually knowing each other interact with each other's posts may be fed into machine learning and/or artificial intelligence that may be used to evaluate whether other accounts actually know each other using how they interact with each other's posts. Various configurations are possible and contemplated without departing from the scope of the present disclosure.

In various examples, this process may be implemented as a group of interrelated software modules or components that perform various functions discussed herein. These software modules or components may be executed within a cloud network and/or by one or more computing devices, such as the enrollment system computing devices 101, 301 of FIGS. 1-3.

This process provides a solution to the technological issue of using biometric and biographic data and social media network or other network search data to verify and/or authenticate identity in a system involving devices that may not be under the complete control of an entity operating an identification system. This allows for enrollment using multiple computing devices that may be located in various places and may be partially or fully controlled by the person being enrolled in the identification system, who may not be trustworthy or be the person he or she asserts to be. As a result, accurate authentication may be made possible while allowing a more flexible system of networked devices.

Further, this process deals with the overabundance of data that evaluation of social media network or other network search data involves in the various ways the above discusses evaluating and processing such data. By evaluating and processing such data as discussed above, computing devices are able to deal with the overabundance of such data created by the technological use of using biometric and biographic data and social media network or other network search data to verify and/or authenticate identity. Thus, the above process relates to a technological solution to a computer network centric issue.

Figure 5:
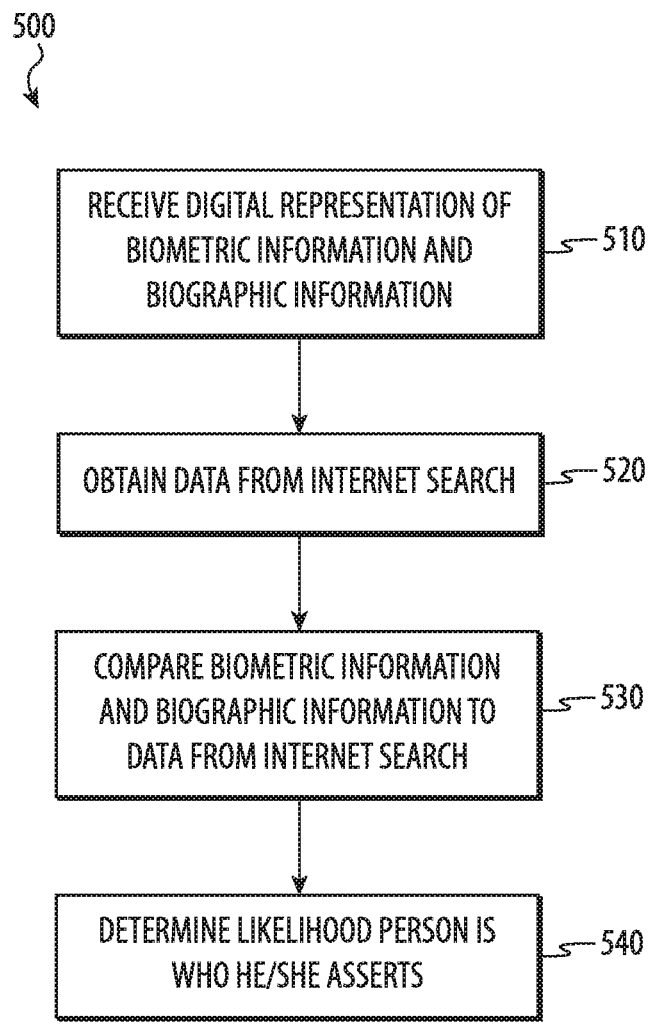
FIG. 5 depicts a flow chart illustrating a second example method for identification system enrollment and/or validation and/or authentication of identity in identification systems.

FIG. 5 depicts a flow chart illustrating a second example method 500 for identification system enrollment and/or validation and/or authentication of identity in identification systems. At 510, a digital representation of a biometric and biographic information may be received from a person via a device. At 520, data from one or more Internet searches related to the digital representation of the biometric and the biographic information may be received. At 530, the digital representation of the biometric and the biographic information may be compared to the data from the Internet searches. At 540, a likelihood that the person is who he or she asserts that he or she is may be determined based upon the comparison.

In various examples, this second example method 500 may be implemented as a group of interrelated software modules or components that perform various functions discussed herein. These software modules or components may be executed within a cloud network and/or by one or more computing devices, such as the enrollment system computing devices 101, 301 of FIGS. 1-3.

Although the second example method 500 is illustrated and described as including particular operations performed in a particular order, it is understood that this is an example. In various implementations, various orders of the same, similar, and/or different operations may be performed without departing from the scope of the present disclosure.

For example, 520 is illustrated and described as receiving data from one or more Internet searches. However, it is understood that this is an example. In various implementations, data may be obtained by searching one or more databases and/or networks other than and/or in addition to the Internet. Various configurations are possible and contemplated without departing from the scope of the present disclosure.

Figure 6:
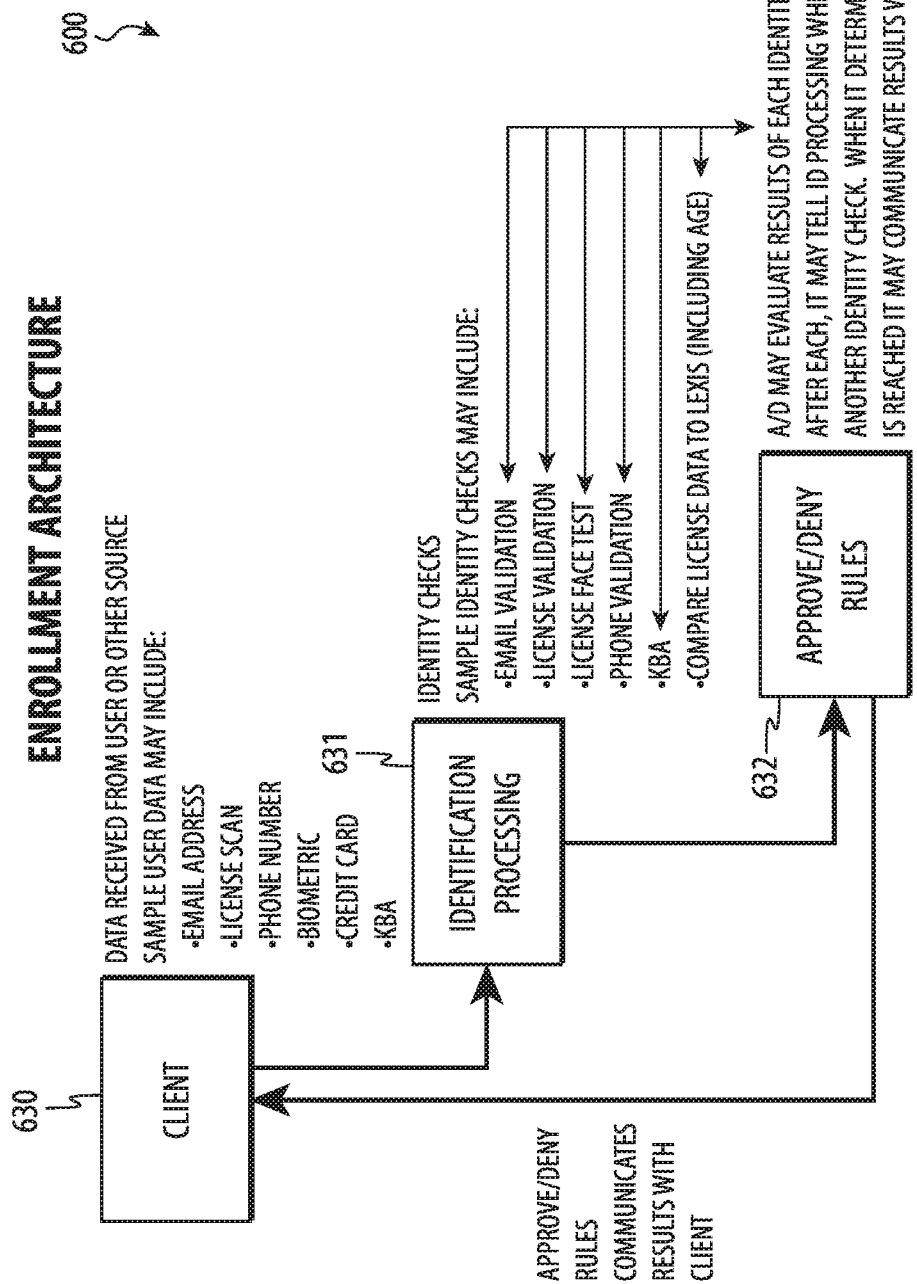
FIG. 6 depicts an example architecture for identification system enrollment and/or validation and/or authentication of identity in identification systems.

FIG. 6 depicts an example architecture 600 for identification system enrollment and/or validation and/or authentication of identity in identification systems. This example architecture 600 may be implemented as one or more sets of APIs, software modules or instructions, computing devices, within a cloud network, and so on. The example architecture 600 may include a client 630, identification processing 631, approve/deny rules 632, and so on. For example, an implementation of this example architecture 600 may include a client 630 module, an identification processing 631 module, and an approve/deny rules 632 module.

A user may enter data via the client 630. This data may include one or more email addresses, driver's license or other identification scans, phone numbers, biometrics (or digital representations thereof), credit cards, KBA, other biographic information, and so on. In various examples, the client 630 may obtain and verify as genuine a digital representation of one or more biometrics for a person and biographic information for that person as discussed above with respect to FIGS. 3 and/or 4.

In some implementations, some data may be entered only if requested by the approve/deny rules 632. In various implementations, entered data may be immediately sent to identification processing 631.

Identification processing 631 may perform various identity checks and/or otherwise check the entered information. This may include email validation, driver's license or other identification validation, a comparison of a provided picture to a picture on the driver's license or other identification, phone number validation, KBA validation, comparison of data from the driver's license or other identification to that indicated in a database (such as Lexis-Nexis), and so on. Identification processing 631 may evaluate the data sent by the client 630 and serially send results of each check of test to the approve/deny rules 632 logic. In various examples, the identification processing 631 and/or the approve/deny rules 632 may compare digital representation of one or more biometrics for a person and biographic information for that person to data from an internet and/or other network search as discussed above, such as with respect to FIG. 5. The approve/deny rules 632 may reply when the approve/deny rules 632 is ready for the results of the next check or test.

Approve/deny rules 632 may serially evaluate the results of each identity check. After each, the approve/deny rules 632 may tell identification processing 631 whether to perform another identity check. When the approve/deny rules 632 determine that a critical point is reached (the point when the identity of the person can be authenticated), the approve/deny rules 632 may communicate with the client 630 (1) pass, (2) fail, or (3) more information needed in order to authenticate the identity of the person. In various implementations, the approve/deny rules 632 may be implemented outside an API used to implement the client 630 and/or the identification processing 631 and may be easily modified without recompiling.

The aggregate of the identity checks that have been performed may be a combination of the weight of each of the identity check and the determined score for each identity check. This may combine an importance associated with a particular identity check with an index of accuracy for that identity check.

For example, a particular set of KBA questions may be assigned a difficulty rating and the accuracy of the responses to the questions may be scored. A score of 95 out of 100 for a set of difficult rated KBA questions may be assigned more weight, such as 10% more weight, than if a phone number provided by the person proved to be valid.

Weights may be assigned and scores may be evaluated for a number N identity checks. The weighted scores may be aggregated, such as each time an identity check is performed, and the aggregate may be evaluated to determine whether the person should be approved or denied enrollment. Thus, the certainty that the person is or is not who he or she asserts can be indicated by the aggregate such that the whole provides more certainty that just the sum of the parts.

In some implementations, the example architecture may evaluate a "most verified person" status, or MVP. For MVP, identification processing 631 may always exhaust all checks or tests. Similarly for MVP, approve/deny rules 632 may return either pass or fail rather than pass, fail, or more information needed.

This example architecture 600 may provide the benefit that limitless identity checks may be able to be performed using a limited set of information provided by the person to the client 630 and/or obtained from the person. Thus, identity checks may be added, removed, modified, and so on without changing the information that the person provides. This may allow accuracy of authentication to be improved without making the person being enrolled aware of it.

Further, being able to perform any number of identity checks until the identity system is confident that the person is who he or she asserts to be using a limited set of information obtained from the person limits the amount of communication with and/or interaction with the person. This may allow a high degree of accuracy while minimizing computing device or system resources for the communication and/or interaction and improving the user enrollment experience.

The example architecture 600 may assign an importance and accuracy to each identity check, determine a score based thereon, and perform identity checks until the aggregate of the scores reaches a confidence threshold (such as 95%) that the person is who he or she asserts to be in order to approve the person for enrollment. Alternatively, the example architecture 600 may determine that too much suspicion exists that the person may not who he or she asserts to be and should report to the entity operating the identity system for in person verification and/or authentication and thus deny the person for enrollment.

Performance of the identity checks in a serial or substantially serial fashion may enable the example architecture 600 to improve the speed of the process and/or limit the amount of computing device and/or other resources used to perform the identity checks by being able to stop the process when a determination is made using the aggregate score. For example, if the example architecture 600 determines using the aggregate score that the person is who he or she asserts to be with sufficient confidence, the identity checks may be stopped and the person may be allowed to enroll. If not, additional identity checks may be performed. Alternatively, the example architecture 600 may determine that there is too much suspicion that the person may not be who he or she asserts to be and may this stop the process and deny enrollment.

Thus, the example architecture 600 may allow for unlimited identity checks using limited information, but also is able to process speed and computing device and/or other resource consumption by stopping performance of the identity checks once a threshold degree of certainty (such as 90%) is reached regarding the identity of the person. This may balance identity checks with process speed and computing device and/or other resource consumption without reducing certainty of identity authentication.

This may also allow particular identity checks to be performed in a particular order in order to arrive at a determination faster and/or consume less resources. For example, identity checks with scores that are weighted higher than others because they are more likely to positively or negatively indicate authentication may be performed first. This may allow the example architecture 600 to arrive at a determination while performing fewer identity checks than if lower weighted score identity checks were performed first.

By way of another example, some identity checks may take more time to perform and/or consume more computing device and/or other resources. The example architecture 600 may perform identity checks first that use less time and/or resources in order to reduce the time and/or resources that are used to come to an authentication.

In still other examples, various combinations of the above may be used. For example, identity checks may be performed in an order that mixes importance assigned to particular identity checks and time and/or resources used for particular identity checks. Various configurations are possible and contemplated without departing from the scope of the present disclosure.

In various examples, this example architecture 600 may be implemented as a group of interrelated software modules or components that perform various functions discussed herein. These software modules or components may be executed within a cloud network and/or by one or more computing devices, such as the enrollment system computing device, the first user computing device, and/or the second user computing device of FIG. 3.

This example architecture 600 may provide a solution to the technological issue of performing identity checks using biometric and biographic data to verify and/or authenticate identity in a system involving devices that may not be under the complete control of an entity operating an identification system. This may allow for enrollment using multiple computing devices that may be located in various places and may be partially or fully controlled by the person being enrolled in the identification system, who may not be trustworthy or be the person he or she asserts to be. As a result, accurate authentication may be made possible while allowing a more flexible system of networked devices.

Further, this example architecture 600 may deal with the overabundance of data that performing identity checks using biometric and biographic data involves in the various ways the above discusses evaluating and processing data while performing the identity checks. By evaluating and processing data while performing the identity checks as discussed above, computing devices may be able to deal with the overabundance of such data created by the technological use of performing identity checks using biometric and biographic data to verify and/or authenticate identity.

Additionally, as the above discusses various ways that the identity checks may be limited when sufficient identity checks have been performed to verify and/or authenticate identity, the above further may deal with the overabundance of available data by limiting identity checks that need to be performed and further improve computing device function by using fewer computing device resources to perform the disclosed functions. Thus, the present disclosure relates to a technological solution to a computer network centric issue.

Figure 7:
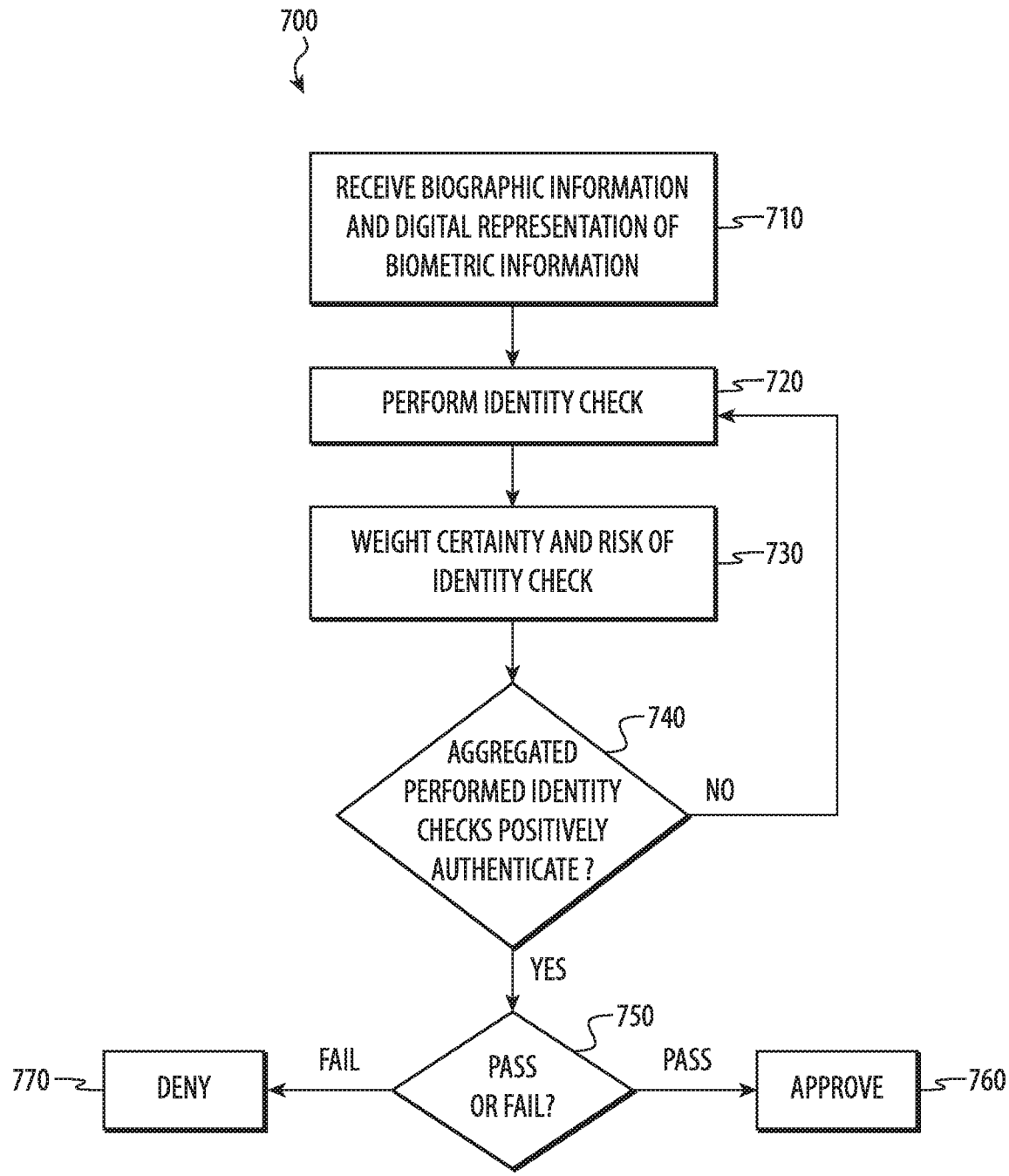
FIG. 7 depicts a third example method for identification system enrollment and/or validation and/or authentication of identity in identification systems.

FIG. 7 depicts a third example method 700 for identification system enrollment and/or validation and/or authentication of identity in identification systems. At 710, biographic information and a digital representation of one or more biometrics for a person may be received. At 720, an identity check may be performed. At 730, a certainty and risk score of the identity check may be weighted.

The flow then proceeds to 740 where it is determined whether or not an aggregate of the performed identity checks positively identifies the person. If so, the flow proceeds to 750. Otherwise, the flow returns to 720 where at least one further identity check is performed.

At 750, after it is determined that the aggregate of the performed identity checks positively authenticates an identity of the person, it is determined whether or not the aggregate indicates to pass or fail the person for enrollment in an identification system. If pass, the flow proceeds to 760 where the person is approved. Otherwise, the flow proceeds to 770 where the person is denied.

In various examples, this third example method 700 may be implemented as a group of interrelated software modules or components that perform various functions discussed herein. These software modules or components may be executed within a cloud network and/or by one or more computing devices, such as the enrollment system computing devices 101, 301 of FIGS. 1-3.

Although the third example method 700 is illustrated and described as including particular operations performed in a particular order, it is understood that this is an example. In various implementations, various orders of the same, similar, and/or different operations may be performed without departing from the scope of the present disclosure.

For example, 730 illustrates and describes weighting both a risk score and a certainty score of the identity check.

However, in various implementations, one or more of these weightings and/or additional weightings may be performed. Various configurations are possible and contemplated without departing from the scope of the present disclosure.

Although the above is illustrated and described as either passing or failing the person, it is understood that this is an example. In some implementations, it may be determined that sufficient information to either pass or fail the person is unavailable. In such a case, the process may return a result that more information is needed. Various situations are possible and contemplated without departing from the scope of the present disclosure.

In numerous implementations, various identity checks may be performed. An artificial intelligence based data process may evaluate and weigh the certainty and risk of each identity check. In combination, the various certainty and risk of each identity check may be used to create a risk score. The risk score may enable an identification system to authenticate the identity of a person with a minimum amount of input from the person or prompting for additional information.

After each test, the identity check process may determine in aggregate whether enough information has been received to positively authenticate if the person is who they say they are. Alternatively, if the identity check process determines enough information has not been received, the identity check process may determine that new tests need to be run or new information is to be obtained.

For example, the identity check process may run three identity checks or tests. One identity check may be a confidence score of comparing a driver's license photo to an image the person captured of himself or herself. A second check may compare license information from the driver's license photo to public data that exists on the person being authenticated. A third check may review an image the person captured of himself or herself against data about the person and the photo available on the internet. After each check or test, the identity check process may return a confidence score. By creating thresholds for each test, weighting each test differently, and then in combination creating a new risk by aggregating the risk of each individual score, the identity check process may determine whether to ask for more information, to have the person go for an in person interview, and so on.

Other identity checks may include, but are not limited to, phone verification, geofencing, credit card verification, proxy server evaluation, email address validation, public and governmental record searches, education checks, and so on. Various configurations are possible and contemplated without departing from the scope of the present disclosure.

In numerous implementations, various of the above techniques may be combined in a system for identification system enrollment and validation. As discussed above with respect to FIGS. 1-7, a digital representation of a biometric for a person and biographic information for a person may be received and determined to be genuine. The digital representation of the biometric and the biographic information may be compared to data obtained from a social media network or other internet or other network search to determine a likelihood that the person is who he or she asserts. Finally, identity checks may be performed where certainty and risk of each identity check is scored and weighted and the aggregate of performed identity checks is evaluated to determine whether or not an identity of the person can be positively authenticated. As a result, the person may be approved or denied to enroll in the identity system.

For example, the example architecture 600 described above with respect to FIG. 6 may be used to implement some or all of the techniques discussed above with respect to FIGS. 1-7 to perform identity system enrollment and validation and/or authentication. The client 630 may be implemented as one or more modules or APIs executed within a cloud network and/or by one or more computing devices to obtain and verify as genuine a digital representation of one or more biometrics for a person and biographic information for that person as discussed above with respect to FIGS. 3 and/or 4. The identification processing 631 and/or the approve/deny rules 632 may be implemented as one or more modules or APIs executed within a cloud network and/or by one or more computing devices to compare digital representation of one or more biometrics for a person and biographic information for that person to data from an internet and/or other network search as discussed above, such as with respect to FIG. 5. The identification processing 631 may be implemented as one or more modules or APIs executed within a cloud network and/or by one or more computing devices to perform various identity checks using the provided information. The approve/deny rules 632 may be implemented as one or more modules or APIs executed within a cloud network and/or by one or more computing devices to evaluate and aggregate the results of identity checks, determine whether or not to perform additional identity checks, and approve or deny the person for enrollment after having determined from the aggregate whether or not the person can be authenticated as the person he or she asserts to be. Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

In one example, an application may operate on a mobile electronic device (such as a web browser, an app, and so on). A person may start enrollment in an identification system by using the application to provide information (such as an email address, a phone number, a name, an address, payment information, and so on), take a picture of the person's face, and take a picture and/or otherwise scan a piece of identification (such as a driver's license, military identification, state identification, passport, and so on). The application and/or one or more associated enrollment system computing devices may use the information to verify the information, such as by sending a message to the mobile electronic device to verify the source of the request, sending a verification text to the phone number, sending a verification email to the email address, and so on. Similarly, the application (and/or the enrollment system computing device) may verify the picture of the person's face (such as by illuminating one or more different colored light emitting diodes and/or other light sources as the picture is taken in a random and/or other sequence and verifying that one or more irises in the picture dilate as expected based on the light sequence to verify that the picture is taken of a live face) and/or the picture of the piece of identification (such as using white light to verify that the piece of identification is genuine). Likewise, the application and/or the enrollment system computing device may authenticate the identity of the person by obtaining information (such as by communicating with one or more third party databases, such as Lexis Nexis, that store various information about people) using data derived from the piece of identification (and/or the information provided by the person) and performing one or more KBA tests by querying the person based thereon (such as a number of questions that are answered within a period of time, such as two minutes, based on previous homes, financial accounts, vehicles, and so on associated with the data derived from the piece of identification). In some implementations, the application and/or the enrollment system computing device may further authenticate the person's identity by ensuring that a picture on the piece of identification matches the picture taken of the person's face. If the application and/or the enrollment system computing device verifies the information (which may ensure that the person is in present control of the mobile electronic device), verifies the picture of the person's face (which may ensure that the picture is a live picture of the person operating the mobile electronic device), verifies the piece of identification (which may ensure that the piece of identification is valid), authenticates the person's identity (which may ensure that the person is who the person purports to be), the application and/or the enrollment system computing device may enroll the person in an identification system. The application and/or the enrollment system computing device may enroll the person in the identification system by storing a picture of the person's face (and/or a hashed version and/or other digital representation thereof) and the information provided by the person, information obtained from the piece of identification, information obtained as part of the KBA test, and/or other information associated with the picture of the person's face (and/or a hashed version and/or other digital representation thereof) and/or one or more other digital representations of biometrics. Subsequently, the picture of the person's face (and/or a hashed version and/or other digital representation thereof) and/or one or more other digital representations of biometrics may be matched to stored digital biometric data (and/or hashed versions and/or other digital representations thereof) before access is allowed to stored information associated with the identity. Various configurations are possible and contemplated without departing from the scope of the present disclosure.

In various implementations, a system for identification system enrollment and validation may include at least one non-transitory storage medium that stores instructions, a communication component, and at least one processor communicably coupled to the communication component. The at least one processor may execute the instructions to receive a digital representation of a biometric for a person from a device via the communication component, receive biographic information for the person via the communication component, receive monitoring of capture of the digital representation of the biometric via the communication component, and determine whether the digital representation of the biometric is genuine using the monitoring.

In some examples, the at least one processor may enroll the person in the identification system when the processor determines the digital representation of the biometric to be genuine. In a number of examples, the digital representation of the biometric may be an image of at least a portion of the person. In various examples, the monitoring may include at least one image of the person capturing the image.

In some examples, the device may be a first device and includes iris dilation responses to a sequence of colored lights presented during the capture of the digital representation of the biometric. In some such examples, the monitoring may be received from the device.

In some implementations, a system for identification system enrollment and validation may include at least one non-transitory storage medium that stores instructions, a communication component, and at least one processor communicably coupled to the communication component. The at least one processor may execute the instructions to receive a digital representation of a biometric for a person and biographic information for the person via the communication component; obtain data from a network search using the digital representation of the biometric and the biographic information; generate a comparison of the digital representation of the biometric and the biographic information to the data from the network search; and using the comparison, determine whether the person is who the person asserts.

In various examples, the comparing may be based at least on a volume of the data returned, a number of sources that return the data, reliability of the sources that return the data, a number of social media connections indicated by the sources, accuracy review of the data, positive identification of the social media connections, or assessment whether the person knows one of the social media connections. In a number of examples, the data may include information from a social media network.

In some examples, the digital representation of the biometric may be an image of at least a portion of the person. In various such examples, the network search may be an image search that uses the image.

In a number of embodiments, a system for identification system enrollment and validation may include at least one non-transitory storage medium that stores instructions, a communication component, and at least one processor communicably coupled to the communication component. The at least one processor may execute the instructions to receive biographic information for a person and a digital representation of a biometric for the person via the communication component, perform a number of identity checks using the biographic information and the digital representation of the biometric, weight certainty and risk of each of the number of identity checks, and determine whether to approve the person for identification system enrollment using an aggregation of the identity checks.

In various examples, the at least one processor may cease to perform the number of identity checks when the aggregation of the identity checks allows for authentication of an identity of the person. In some such examples, the at least one processor may authenticate the identity of the person.

In some examples, at least one of the number of identity checks may be a validation of the biographic information. In a number of examples, the at least one processor may receive a scan of a piece of identification and results of a white light verification of the piece of identification.

In various examples, the at least one processor may verify that the person is in possession of a mobile electronic device. In some such examples, the at least one processor may receive the biographic information for the person and the digital representation of the biometric for the person from the mobile electronic device via the communication component. In a number of examples, at least one of the number of identity checks may be a comparison between the biographic information and the digital representation of the biometric.

As described above and illustrated in the accompanying figures, the present disclosure relates to identification system enrollment and validation and/or authentication. In various implementations, a person may be electronically monitored while providing a digital representation of a biometric and biographic information to ensure that authentic biometric data for that person is provided. In some implementations, a provided digital representation of a biometric and biographic data may be compared against data returned from internet searches to assess the likelihood that the person is who the person claims to be. In various implementations, a number of identity checks may be performed for a person who provides a digital representation of a biometric and biographic data where a certainty and risk score is determined for each identity check and aggregated to determine if obtained information is sufficient to positively authenticate that the person is who the person claims to be. In numerous implementations, various combinations of these features may be performed.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

Although particular methods involving particular operations have been illustrated and described, it is understood that these are examples. In various implementations, various arrangements of the same, similar, and/or different operations may be performed without departing from the scope of the present disclosure. Various configurations are possible and contemplated.

Aspects of the present disclosure may be performed by one or more devices, such as one or more computing devices, that may be configured as part of a system. For example, one or more computing devices that perform one or more aspects of this disclosure may be part of a cloud computing system, cooperative computing arrangement, and so on. Such devices may include one or more processing units, one or more non-transitory storage media (which may take the form of, but is not limited to, a magnetic storage medium; optical storage medium; magneto-optical storage medium; read only memory; random access memory; erasable programmable memory; flash memory; and so on), and/or other components. The processing unit may execute one or more instructions stored in the non-transitory storage medium to perform one or more processes that utilize one or more of the techniques disclosed herein.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for identification system enrollment and validation, comprising:
   at least one non-transitory storage medium that stores instructions;
   a communication component; and
   at least one processor, communicably coupled to the communication component, that executes the instructions to:
      receive a digital representation of a biometric for a person from a personal electronic device associated with the person via the communication component, the digital representation of the biometric corresponding to a face of the person in a sequence of images or video;
      receive biographic information for the person via the communication component;
      receive monitoring of capture of the digital representation of the biometric via the communication component, the monitoring comprising iris dilation responses to a sequence of colored lights presented during the capture of the digital representation of the biometric, the iris dilation responses being obtained from the sequence of images or video; and determine whether the digital representation of the biometric is genuine using the monitoring by using the iris dilation responses to determine that the face is genuine.

2. The system of claim 1, wherein the at least one processor enrolls the person in the identification system when the at least one processor determines the digital representation of the biometric to be genuine.

3. The system of claim 1, wherein the monitoring is received from the personal electronic device.

4. The system of claim 1, wherein the sequence of colored lights is random.

5. The system of claim 1, wherein the biographic information is obtained from an identification card.

6. The system of claim 5, wherein the biographic information is obtained from an image of the identification card.

7. The system of claim 5, wherein white light verification is performed on the identification card.

8. The system of claim 1, wherein the biographic information includes an email address.

9. The system of claim 1, wherein the biographic information includes a phone number.

10. The system of claim 1, wherein the biographic information includes a name.

11. The system of claim 1, wherein the biographic information includes an address.

12. The system of claim 1, wherein the biographic information includes payment information.

13. The system of claim 1, wherein the at least one processor executes the instructions to: verify the biographic information.

14. The system of claim 1, wherein the at least one processor executes the instructions to: authenticate an identity of the person.

15. The system of claim 14, wherein the at least one processor executes the instructions to: authenticate the identity of the person by obtaining information and performing at least one knowledge-based authentication test using the information.

16. The system of claim 15, wherein the information is obtained using the biographic information.

17. The system of claim 14, wherein the at least one processor executes the instructions to: enroll the person in the identification system upon authenticating the identity of the person.

18. The system of claim 17, wherein the identification system comprises a biometric identification system.

19. The system of claim 18, wherein the at least one processor executes the instructions to: store the digital representation of the biometric for the person for subsequent biometric identification using the biometric identification system.

20. The system of claim 1, wherein the biographic information includes an answer to a knowledge-based authentication question.

* * * * *